US010203548B2

(12) United States Patent
Lin (10) Patent No.: US 10,203,548 B2
(45) Date of Patent: Feb. 12, 2019

(54) BACKLIGHT ASSEMBLY AND DISPLAY DEVICE

(71) Applicant: BOE TECHNOLOGY GROUP CO., LTD., Beijing (CN)

(72) Inventor: Chiachiang Lin, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 205 days.

(21) Appl. No.: 15/128,054

(22) PCT Filed: Sep. 14, 2015

(86) PCT No.: PCT/CN2015/089529
§ 371 (c)(1),
(2) Date: Sep. 21, 2016

(87) PCT Pub. No.: WO2016/179933
PCT Pub. Date: Nov. 17, 2016

(65) Prior Publication Data
US 2018/0173056 A1    Jun. 21, 2018

(30) Foreign Application Priority Data
May 8, 2015  (CN) .......................... 2015 1 0233208

(51) Int. Cl.
*G02F 1/1335* (2006.01)
*G02F 1/29* (2006.01)

(52) U.S. Cl.
CPC .... *G02F 1/133602* (2013.01); *G02F 1/13362* (2013.01); *G02F 1/133504* (2013.01);
(Continued)

(58) Field of Classification Search
CPC ......... G02F 1/133602; G02F 1/133504; G02F 1/13362; G02F 1/133621;
(Continued)

(56) References Cited

U.S. PATENT DOCUMENTS

2008/0259233 A1    10/2008  Krijn et al.
2009/0122017 A1*   5/2009   Emig ...................... G06F 3/044
                                                            345/173
(Continued)

FOREIGN PATENT DOCUMENTS

CN    101341763 A    1/2009
CN    102141714 A    8/2011
(Continued)

OTHER PUBLICATIONS

Office Action received for Chinese Patent Application No. 201510233208.2, dated Oct. 27, 2017, 16 pages (9 pages of English Translation and 7 pages of Office Action).
(Continued)

*Primary Examiner* — Dmitriy Bolotin
(74) *Attorney, Agent, or Firm* — Womble Bond Dickinson (US) LLP (57) ABSTRACT

The embodiments of the present invention provide a backlight assembly and a display device. The direction of light for display can be adjusted without increasing the thickness of the display device. The backlight assembly comprises: an adjustable liquid crystal lens; a first polarizer located on a light input side of the adjustable liquid crystal lens; a determining unit configured for determining an output direction for light from the backlight assembly; and a controlling unit configured for controlling a tilt angle of the liquid crystal in the adjustable liquid crystal lens based on the output direction determined by the determining unit, thereby ensuring light from the backlight assembly propagating in the determined output direction.

15 Claims, 4 Drawing Sheets

(52) U.S. Cl.
CPC ......... *G02F 1/133621* (2013.01); *G02F 1/29* (2013.01); *G02F 2001/133507* (2013.01); *G02F 2001/133607* (2013.01)

(58) Field of Classification Search
CPC ........ G02F 2001/133507; G02F 2001/133607; G02F 1/29
See application file for complete search history.

(56) References Cited

U.S. PATENT DOCUMENTS

| | | | |
|---|---|---|---|
| 2009/0213147 | A1 | 8/2009 | Sagardoyburu et al. |
| 2012/0019733 | A1 | 1/2012 | Kim et al. |
| 2012/0154270 | A1* | 6/2012 | Numao .................... H04N 5/72 345/156 |
| 2012/0300167 | A1 | 11/2012 | You et al. |
| 2013/0038821 | A1* | 2/2013 | Wu .................. G02F 1/133504 349/96 |
| 2013/0038822 | A1* | 2/2013 | Aono ........................ C08J 3/14 349/96 |
| 2015/0062448 | A1* | 3/2015 | S. ............................ G06F 1/169 349/12 |
| 2016/0070137 | A1* | 3/2016 | You .................. G02F 1/133609 349/71 |
| 2016/0356943 | A1* | 12/2016 | Choi .................. G02F 1/13338 |

FOREIGN PATENT DOCUMENTS

| | | |
|---|---|---|
| CN | 102364391 A | 2/2012 |
| CN | 102645814 A | 8/2012 |
| CN | 102713733 A | 10/2012 |
| CN | 103698956 A | 4/2014 |
| CN | 104330916 A | 2/2015 |
| CN | 104777696 A | 7/2015 |

OTHER PUBLICATIONS

International Written Opinion received for PCT Patent Application No. PCT/CN2015/089529, dated Feb. 1, 2016, 11 pages (7 pages of English Translation and 4 pages of Original Document).
International Preliminary Report on Patentability received for PCT Patent Application No. PCT/CN2015/089529, dated Nov. 23, 2017, 14 pages (9 pages of English Translation and 5 pages of Original Document).
International Search Report with English Language Translation, dated Feb. 1, 2016, PCT Application No. PCT/CN2015/089529.
Office Action in Chinese Application No. 201510233208.2 dated Mar. 30, 2017, with English translation. 12 pages.
"Decision on Rejection," CN Application No. 201510233208.2 (dated Mar. 29, 2018).

* cited by examiner

Fig. 7

BACKLIGHT ASSEMBLY AND DISPLAY DEVICE

RELATED APPLICATIONS

The present application is the U.S. national phase entry of PCT/CN2015/089529, with an international filing date of Sep. 14, 2015, which claims the benefit of Chinese Patent Application No. 201510233208.2, filed on May 8, 2015, the entire disclosures of which are incorporated herein by reference.

FIELD OF THE INVENTION

The present invention relates to the field of display technology, particularly to a backlight assembly and a display device.

BACKGROUND OF THE INVENTION

Visual organs receive the most information among the human sensory organs. With the development of society, people make use of more and more abundant visual information. With the continuous progress of electronic science and technology, display technology uses electronic technology to provide flexible visual information, which has gradually entered into people's work and life. Based on the psychological and physiological characteristics of human, the display technology uses light features to form different visual information. Generally, display technology is applied in display device.

At present, the viewing angle of a display device is limited. However, in practice, a display device should be viewed from different directions under different application conditions. In particular, a display device should be viewed from an inclined angle in some situations. For example, for an interactive game requiring the use of a sensor in a mobile phone, or dynamic perspective stereo technology in a fire phone (a mobile phone), the observer should view the screen from different points of view. However, in order to reduce energy consumption, backlight is typically designed as concentrated for viewing the screen directly in the front. Therefore, when viewing the display device from an inclined angle, the displayed image is obviously dark.

Aiming at the above problems, the display device in the prior art uses a technology combining a plurality of light guide plates with a prism film, with different back light, change the direction of light in real time. However, since the display device includes a structure with a plurality of light guide plates and a prism film, the display device with such a structure is very thick, not suitable for mobile or portable equipment.

SUMMARY OF THE INVENTION

The embodiments of the present invention provide a backlight assembly and a display device. The direction of light for display can be adjusted without increasing the thickness of the display device.

To this end, the embodiments of the present invention provide the following solutions.

In an aspect, an embodiment of the present invention provides a backlight assembly. The backlight assembly comprises: an adjustable liquid crystal lens; a first polarizer located on a light input side of the adjustable liquid crystal lens; a determining unit configured for determining an output direction for light from the backlight assembly; and a controlling unit configured for controlling a tilt angle of the liquid crystal in the adjustable liquid crystal lens based on the output direction determined by the determining unit, thereby ensuring light from the backlight assembly propagating in the determined output direction.

In another aspect, an embodiment of the present invention provides a display device. The display device comprises the backlight assembly provided by the embodiment of the present invention and a display panel located on a light output side of the backlight assembly.

In the backlight assembly and the display device provided by the embodiments of the present invention, the backlight assembly comprises: an adjustable liquid crystal lens; a first polarizer located on a light input side of the adjustable liquid crystal lens; a determining unit configured for determining an output direction for light from the backlight assembly; and a controlling unit configured for controlling a tilt angle of the liquid crystal in the adjustable liquid crystal lens based on the output direction determined by the determining unit, thereby ensuring light from the backlight assembly propagating in the determined output direction. The embodiments of the present invention apply the approach of voltage control and the arrangement of the first polarizer, ensuring light propagating in the determined direction. In this way, the problem on the great thickness for a display device comprising a backlight assembly can be solved, which problem is caused due to changing the propagation direction of light with a plurality of light guide plates. Moreover, with the combination of the first polarizer and voltage control, the divergence angle of light can also be adjusted, which makes light passing through the liquid crystal layer more convergent or divergent. Therefore, when light passing through the liquid crystal layer reaches a display screen, the brightness of the display screen can be higher or lower accordingly.

BRIEF DESCRIPTION OF THE DRAWINGS

In order to more clearly illustrate the technical solutions in embodiments of the invention or in the prior art, the appended drawings needed to be used in the description of the embodiments or the prior art will be introduced briefly in the following. Obviously, the drawings in the following description are only some embodiments of the invention, and for those of ordinary skills in the art, other drawings may be obtained according to these drawings under the premise of not paying out creative work.

DETAILED DESCRIPTION OF THE INVENTION

In the following, the technical solutions in embodiments of the invention will be described clearly and completely in connection with the drawings in the embodiments of the invention. Obviously, the described embodiments are only part of the embodiments of the invention, and not all of the embodiments. Based on the embodiments in the invention, all other embodiments obtained by those of ordinary skills in the art under the premise of not paying out creative work pertain to the protection scope of the invention.

Figure 1:
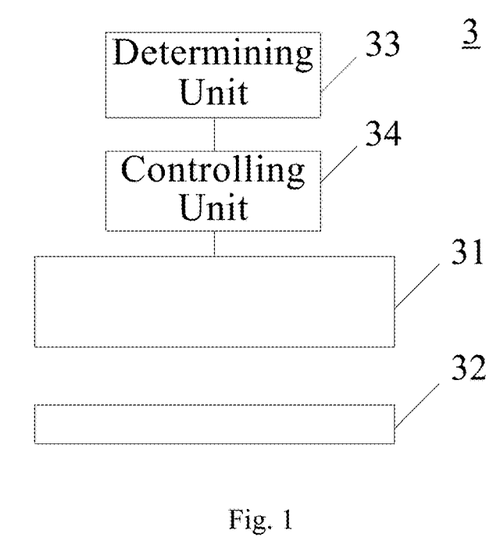
FIG. 1 is a structural schematic diagram of a backlight assembly provided by an embodiment of the present invention.

An embodiment of the present invention provides a backlight assembly 3. As shown in FIG. 1, the backlight assembly 3 comprises: an adjustable liquid crystal lens 31; a first polarizer 32 located on a light input side of the adjustable liquid crystal lens 31; a determining unit 33 configured for determining an output direction for light from the backlight assembly 3; and a controlling unit 34 configured for controlling a tilt angle of the liquid crystal in the adjustable liquid crystal lens 31 based on the output direction determined by the determining unit 33, thereby ensuring light from the backlight assembly propagating in the determined output direction.

In the context of the invention, each "unit" and "module" in the embodiments can be realized by a computer (e.g. personal computer) or a combination of a computer and a suitable sensor; the processing of each "unit" and "module" can be realized e.g. by a processor in the computer.

The determining unit 33 may comprise elements such as camera, position sensor or displacement sensor.

In different regions of the liquid crystal layer, liquid crystal lenses are formed by liquid crystal molecules with different pretilt angles arranged in a focusing form. The liquid crystal layer with such a structure can converge light and increase the intensity of the output light, thereby increasing the brightness of the display screen. Optionally, the liquid crystal lens is a eudipleural liquid crystal lens.

In a specific embodiment of the present invention, the controlling unit 34 can be configured for: based on the determined output direction determined by the determining unit 33, controlling electronic field in one sub-region or a plurality of sub-regions in each region of the adjustable liquid crystal lens 31, thereby controlling a tilt angle of the liquid crystal in the one sub-region or the plurality of sub-regions. In this way, the refractive index of these sub-regions can be changed.

Furthermore, the controlling unit 34 can also be configured for: based on the tilt angle of the liquid crystal in the liquid crystal lens 31, controlling the polarization direction of the light beam entering into the backlight assembly 3; the polarization direction of the light beam passing through the first polarizer 32 is then parallel to the alignment direction of the liquid crystal layer, thereby ensuring light from the backlight assembly propagating in the determined output direction.

It should be noted that in the embodiment, the thickness of the display device capable of changing the direction of light passing through the liquid crystal layer is smaller than 1 cm; if a thin type flexible substrate (with a thickness of about 50 μm) is applied in the liquid crystal lens, the thickness of the display device can be smaller than 0.5 cm, while the thickness of an existing display device changing the direction of light passing through the liquid crystal layer with a plurality of light guide plates is 1cm-2 cm.

The backlight assembly 3 provided by the embodiment of the present invention comprises: an adjustable liquid crystal lens; a first polarizer located on a light input side of the adjustable liquid crystal lens; a determining unit configured for determining an output direction for light from the backlight assembly; and a controlling unit configured for controlling a tilt angle of the liquid crystal in the adjustable liquid crystal lens based on the output direction determined by the determining unit, thereby ensuring light from the backlight assembly propagating in the determined output direction. The embodiments of the present invention apply the approach of voltage control and the arrangement of the first polarizer, ensuring light propagating in the determined direction. In this way, the problem on the great thickness for a display device comprising a backlight assembly can be solved, which problem is caused due to changing the propagation direction of light with a plurality of light guide plates. Moreover, with the combination of the first polarizer and voltage control, the divergence angle of light can also be adjusted, which makes light passing through the liquid crystal layer more convergent or divergent. Therefore, when light passing through the liquid crystal layer reaches a display screen, the brightness of the display screen can be higher or lower accordingly.

Figure 2:
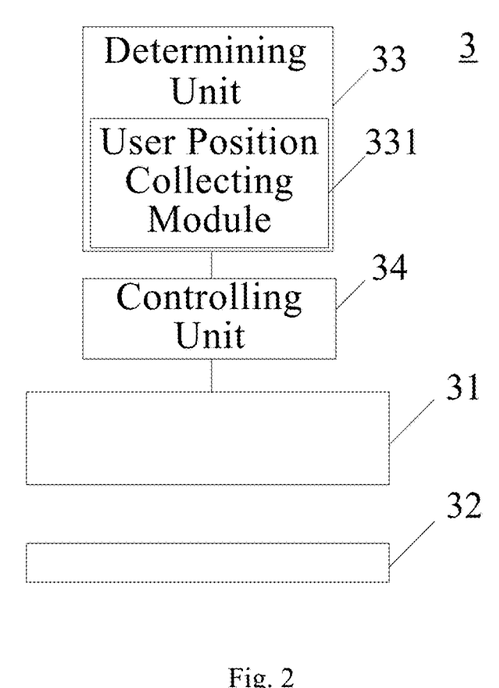
FIG. 2 is a structural schematic diagram of a backlight assembly provided by another embodiment of the present invention.

In an embodiment of the present invention, as shown in FIG. 2, the determining unit 33 comprises a user position collecting module 331 configured for collecting a current position information of a user; in this way, the determining unit 33 is configured for determining an output direction for light from the backlight assembly 3 based on the current position information of the user collected by the user position collecting module 331.

In particular, when the user's position in front of the backlight assembly is changed (for example, when the user moves from directly in front of the backlight assembly to the left front of the backlight assembly), a image sensing unit (such as a camera) of the backlight assembly can perceive changing of the user's position and collect the current position information of the user (such as a position information of the user's eyes) after the user moves. Then the position information can be sent to a processing unit of the backlight assembly, which processing unit can determine the output direction for light from the backlight assembly.

Figure 3A:
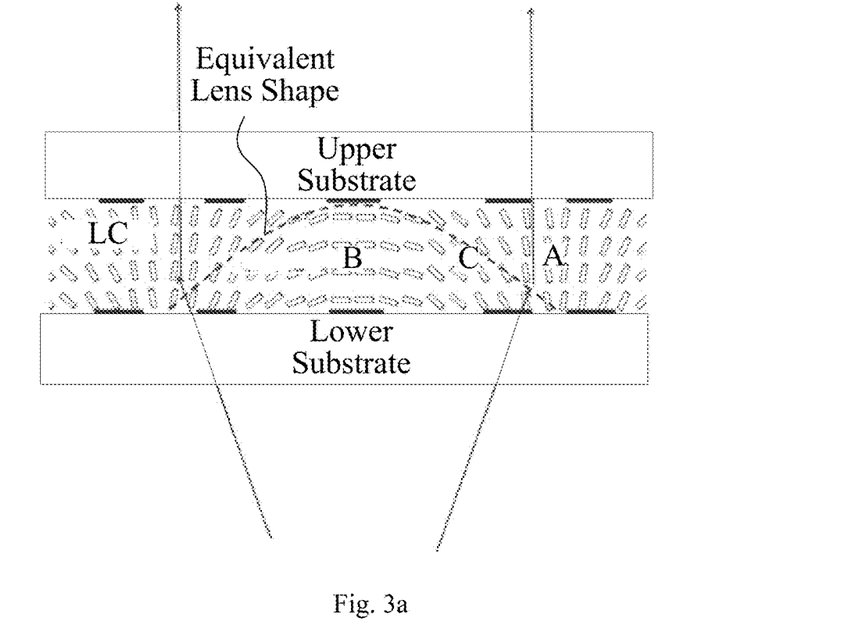
FIG. 3*a* and FIG. 3*b* are structural schematic diagrams of adjustable liquid crystal lenses in the backlight assemblies provided by the embodiments of the present invention.
Figure 3B:
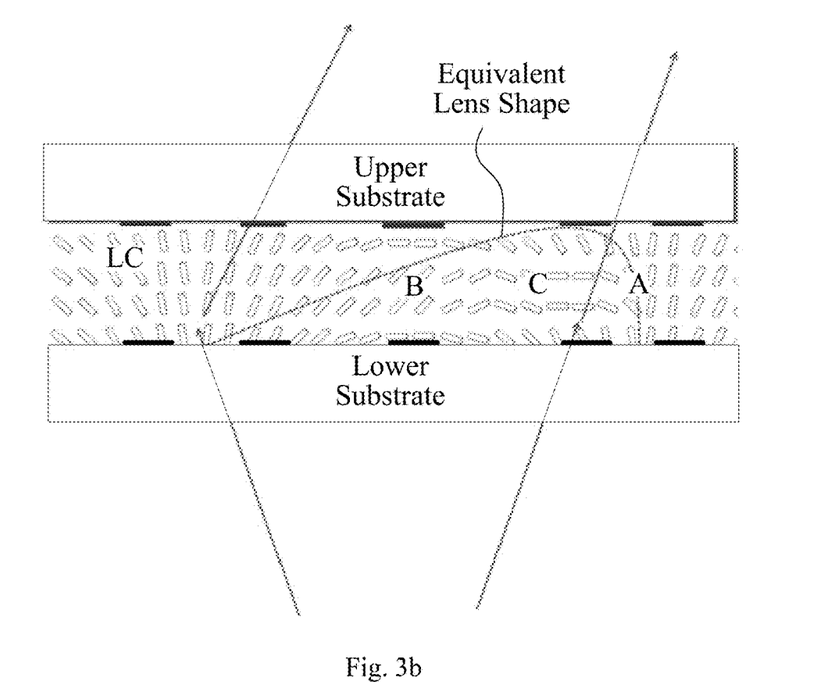

For example, when the user is located directly in front of the backlight assembly, as shown in FIG. 3a, the adjustable liquid crystal lens 31 of the backlight assembly may comprise an upper substrate, a lower substrate, and a liquid crystal layer located between the upper substrate and the lower substrate. The liquid crystal layer can present a eudipleural equivalent lens shape due to different angles of liquid crystal. When the user moves from directly in front of the backlight assembly to the right front of the backlight assembly, the tilt angle of the liquid crystal in the liquid crystal lens 31 should be changed such that the liquid crystal layer can present an equivalent lens shape inclining to the right. As shown in FIG. 3b, a voltage can be applied to the electrodes in the second sub-region B of the liquid crystal layer, such that the tilt angle of liquid crystal in this sub-region is increased, i.e., the tilt angle of liquid crystal is changed from "basically horizontal" in FIG. 3a to "inclining to the right" in FIG. 3b. For the third sub-region C of the liquid crystal layer, due to the affect of liquid crystal rotation in the second sub-region B, the tilt angle of liquid crystal in the third sub-region C is changed from "inclining to the left" in FIG. 3a to "basically horizontal" in FIG. 3b. Moreover, in FIG. 3a, the tilt angle of liquid crystal in the first sub-region A is almost vertical; since the tilt angle of liquid crystal in the third sub-region C is changed into "basically horizontal", the liquid crystal in the first sub-region A also rotates to the horizontal direction. To maintain the liquid crystal in the first sub-region A in a substantially vertical state, a voltage can be applied to the electrodes in the second sub-region A.

It should be noted that positive liquid crystal (i.e. positive dielectric anisotropy liquid crystal) is applied in the embodiment. If negative liquid crystal (i.e. negative dielectric anisotropy liquid crystal) is applied, the liquid crystal in the second sub-region B should be in a substantially horizontal state, and the liquid crystal in the third sub-region C should be in a substantially vertical state; in this way, the achieved optical effect is same with the optical effect of the embodiment applying positive liquid crystal.

With the above mentioned approach of voltage control, after a light beam passes through the liquid crystal layer, the propagation direction of the light beam inclines to the right; therefore, the user located on the right front of the backlight assembly can see the display image clearly.

In addition, if the user is located directly in front of the backlight assembly and the light intensity of the environment is getting smaller, the following steps can be used. A voltage can be applied to the electrodes in the first sub-region and the third sub-region of each region in the liquid crystal layer, such that the tilt angle of liquid crystal in the first sub-region and the third sub-region is greater than the pretilt angle. With such an approach of voltage control, after a light beam passes through the liquid crystal layer, the propagation direction of the light beam can be concentrated in the center, i.e., the diopter of the liquid crystal lens is increased). In this way, more light can reach the user's eyes such that a brighter screen can be "observed" by the user's eyes.

In the above mentioned embodiment, the output direction for light from the backlight assembly is determined based on the current position information of a user. The propagation direction of the light beam passing through the liquid crystal layer of the backlight assembly can be adjusted in real time, so that the output direction of the light beam is concentrated to the position of the user's eyes. In this way, a user moving casually in front of the backlight assembly can always see the display image clearly without distortion. The display image will not be fuzzy for the user due to reduced brightness. Further, the user's position in the embodiment can also refer to two positions of the user's left eye and right eye; by quickly switching the backlight assembly, light beams passing through the liquid crystal layer of the display device can be directed to the left eye and right eye respectively. Therefore, the user can perceive a stereoscopic effect of the image.

Figure 4:
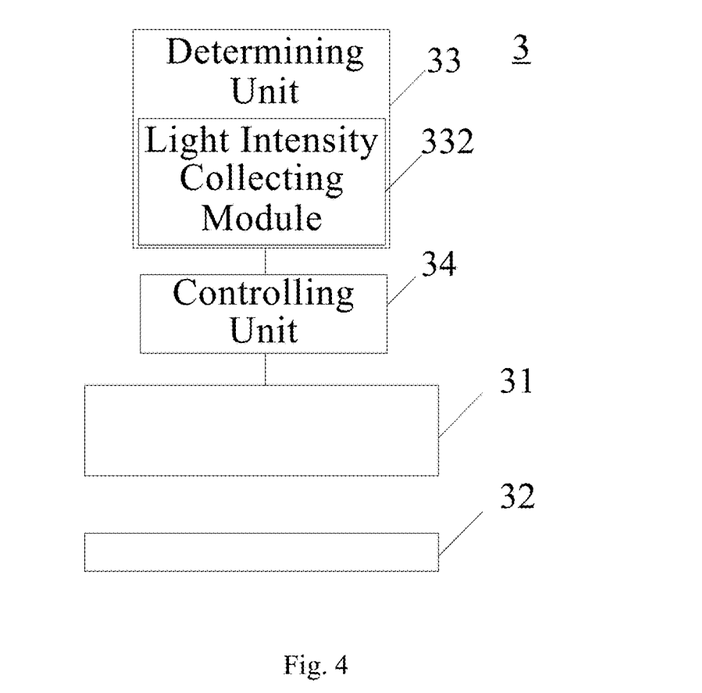
FIG. 4 is a structural schematic diagram of a backlight assembly provided by yet another embodiment of the present invention.

In an embodiment of the present invention, as shown in FIG. 4, the determining unit 33 may comprise a light intensity collecting module 332 configured for collecting a light intensity information of the environment; in this way, the determining unit 33 can be configured for determining an output direction for light from the backlight assembly 3 based on the light intensity information collected by the light intensity collecting module 332.

In particular, when the ambient light intensity of the backlight assembly becomes lower (i.e., the ambient brightness becomes lower), a light sensing unit of the backlight assembly (such as a light intensity sensor or brightness sensor) can perceive the current environmental change and the collect a light intensity information; then the information can be sent to a processing unit of the backlight assembly, which processing unit can determine the output direction for light from the backlight assembly; the light beam passing through the liquid crystal layer is then more divergent, thereby reducing the visual brightness. In addition, when the ambient light intensity of the backlight assembly becomes higher (i.e., the ambient brightness becomes higher), the light sensing unit of the backlight assembly can perceive the current environmental change and the collect a light intensity information; then the information can be sent to the processing unit of the backlight assembly for determining the output direction for light from the backlight assembly.

In the above mentioned embodiment, the output direction for light from the backlight assembly is determined based on the current environmental light intensity information. The propagation direction of the light beam passing through the liquid crystal layer of the backlight assembly can be adjusted in real time, so that the screen brightness can be adjusted to be higher or lower. In this way, a user can see the display image clearly and comfortably.

It should be noted that the above mentioned two modules (i.e., user position collecting module and light intensity collecting module) can be applied together. That is, changing of user's position and changing of environmental light intensity can be considered together. Moreover, these two embodiments are only illustrated as examples for the factors, which can be used as the basis for determining the output direction for light passing through the liquid crystal layer. Backlight assemblies applying other factors also pertain to the scope of the invention.

Figure 5:
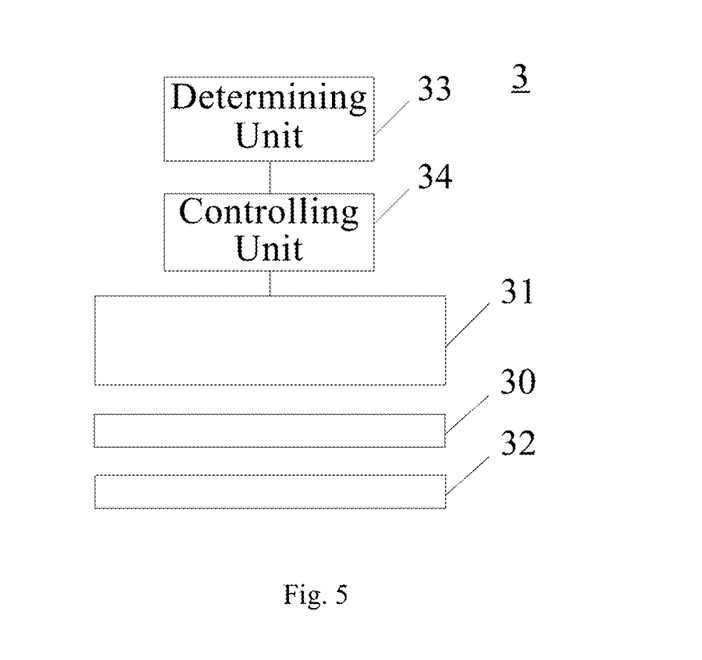
FIG. 5 is a structural schematic diagram of a backlight assembly provided by still another embodiment of the present invention.

Optionally, in an embodiment of the present invention, as shown in FIG. 5, the backlight assembly 3 further comprises a brightness enhancement film (BEF) 30 located between the adjustable liquid crystal lens 31 and the first polarizer 32.

In particular, the brightness enhancement film 30 has a function of optical convergence for light beam. A light beam passing through the first polarizer 21 becomes a polarized light beam. After the polarized light beam passes through the brightness enhancement film 30, the polarized light beam is converged. Then the converged polarized light beam passes through the liquid crystal layer. Compared with the output light passing through the first polarizer and the liquid crystal layer in sequence, this output light is more convergent.

Optionally, in an embodiment of the present invention, the adjustable liquid crystal lens 31 comprises a color film substrate and an array substrate. The color film substrate and array substrate are polyimide (PI) flexible substrates or ultra-thin glass substrates.

In particular, the thickness of a PI flexible substrate is only 1-50 μm; an ultra-thin glass substrate is thinner than a PI flexible substrate. Therefore, the thickness of the display device can be reduced by applying these two kinds of substrates.

Optionally, in an embodiment of the present invention, the liquid crystal in the adjustable liquid crystal lens is polymer network liquid crystal.

In particular, the response speed of liquid crystal can be higher by applying polymer network liquid crystal. In this way, the light direction can be switched with a frequency of e.g. 120 Hz.

In the above mentioned embodiments, the first polarizer can be a reflective polarizer.

In particular, in the backlight assembly, the polarization direction of the light beam can be filtered with the first polarizer, which is located between the light source and the adjustable liquid crystal lens. In the embodiment of the invention, the first polarizer is optionally a reflective polarizer. The reflective polarizer can filter the polarization direction of the light beam and reflect light beams with other polarization directions. Then the light beams with other polarization directions can be reflected between a reflective plate of the backlight source and the reflective polarizer. These light beams can pass through the reflective polarizer if the polarization direction thereof is same with the polarization direction of the reflective polarizer. In this way, light can be prevented from being absorbed by the polarizer of the liquid crystal display, thereby improving the efficiency of the light source. By setting the direction of the reflective polarizer, the polarization direction of the light beam passing through the reflective polarizer can be parallel to a polarization direction, in which the liquid crystal lens can produce direction deflection for light. In other words, with such a polarization direction, the light beam can be effectively adjusted by the liquid crystal lens, thereby controlling the propagation direction of light.

Further, the reflective polarizer can be a dual brightness enhancement film (DBEF). Compared with other reflective polarizer, the dual brightness enhancement film has better effects of brightness enhancement and polarization.

Figure 6:
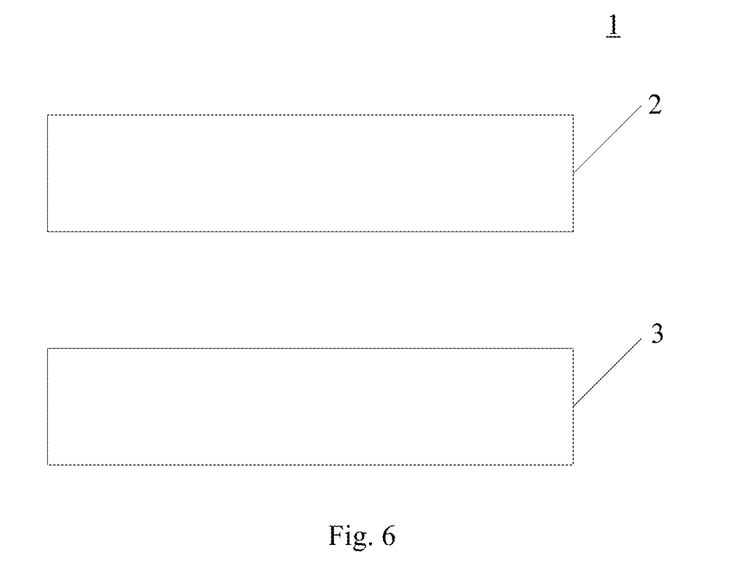
FIG. 6 is a structural schematic diagram of a display device provided by an embodiment of the present invention.

The display device provided by the embodiments of the present invention can be any portable device with liquid crystal display screen, such as such as mobile phone, tablet computer, liquid crystal TV and game machine. As shown in FIG. 6, the display device 1 can comprise the backlight assembly 3 of the above mentioned embodiments and a display panel 2 located on a light output side of the backlight assembly 3.

It should be noted that the specific structure and function of the backlight assembly 3 in the display device can refer to the above mentioned embodiments, which will not be repeated herein.

The display device 1 provided by the embodiment of the invention can comprise the backlight assembly 3 of the above mentioned embodiments and a display panel 2 located on a light output side of the backlight assembly 3. By arranging the backlight assembly 3 in the display device, the light beam is controlled and propagates in the determined direction. In this way, the problem on the great thickness for a display device can be solved, which problem is caused due to changing the propagation direction of light with a plurality of light guide plates.

Figure 7:
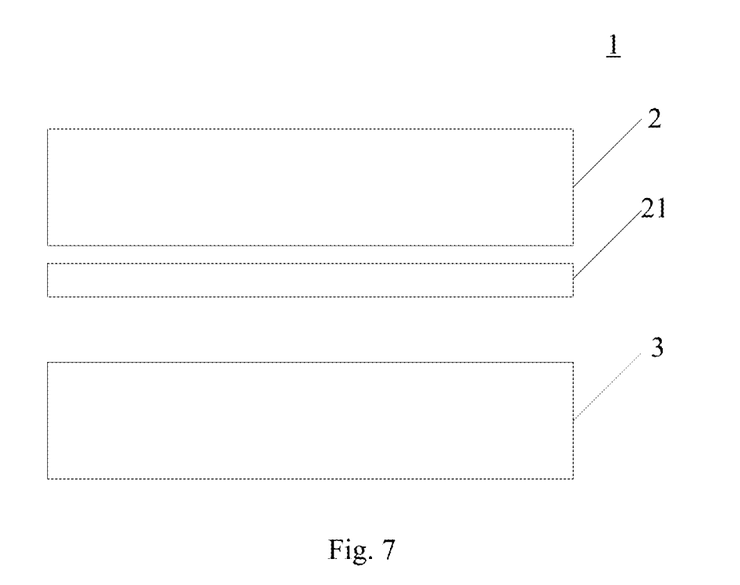
FIG. 7 is a structural schematic diagram of a display device provided by another embodiment of the present invention.

Optionally, in an embodiment of the present invention, as shown in FIG. 7, the display panel 2 may comprise a second polarizer 21 located on a light input side of the display panel 2; the polarization direction of the second polarizer 21 is parallel to the polarization direction of the first polarizer 32.

In particular, the first polarizer 32 is located on a light input side of the backlight assembly 3; the second polarizer 21 is located on a light input side of the display panel 2. The polarization direction of the second polarizer 21 is parallel to the polarization direction of the first polarizer 32, so that the output light from the display panel 2 can propagate in the output direction determined by the determining unit 33.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

What is claimed is:

1. A backlight assembly comprising:
an adjustable liquid crystal lens;
a first polarizer located on a light input side of the adjustable liquid crystal lens;
a determining unit configured for determining an output direction for light from the backlight assembly; and
a controlling unit configured for controlling a tilt angle of the liquid crystal in the adjustable liquid crystal lens based on the output direction determined by the determining unit, thereby ensuring light from the backlight assembly propagating in the determined output direction;
wherein the determining unit comprises a light intensity collecting module configured for collecting a light intensity information of the environment; and wherein the determining unit is configured for determining an output direction for light from the backlight assembly based on the light intensity information collected by the light intensity collecting module.

2. The backlight assembly according to claim 1, wherein the controlling unit is configured for:
based on the determined output direction, controlling electronic field in one sub-region or a plurality of sub-regions in each region of the adjustable liquid crystal lens, thereby controlling a tilt angle of the liquid crystal in the one sub-region or the plurality of sub-regions.

3. The backlight assembly according to claim 1, wherein the determining unit comprises a user position collecting module configured for collecting a current position information of a user; and wherein the determining unit is configured for determining an output direction for light from the backlight assembly based on the current position information of the user collected by the user position collecting module.

4. The backlight assembly according to claim 1, further comprising: a brightness enhancement film (BEF) located between the adjustable liquid crystal lens and the first polarizer.

5. The backlight assembly according to claim 1, wherein the liquid crystal in the adjustable liquid crystal lens is polymer network liquid crystal.

6. The backlight assembly according to claim 1, wherein the first polarizer is a reflective polarizer.

7. The backlight assembly according to claim 6, wherein the reflective polarizer is a dual brightness enhancement film (DBEF).

8. A display device comprising the backlight assembly according to claim 1 and a display panel located on a light output side of the backlight assembly.

9. The display device according to claim 8, wherein the display panel comprises a second polarizer located on a light input side of the display panel; and wherein the polarization direction of the second polarizer is parallel to the polarization direction of the first polarizer.

10. The display device according to claim 8, wherein the controlling unit is configured for:
based on the determined output direction, controlling electronic field in one sub-region or a plurality of sub-regions in each region of the adjustable liquid crystal lens, thereby controlling a tilt angle of the liquid crystal in the one sub-region or the plurality of sub-regions.

11. The display device according to claim 8, wherein the determining unit comprises a user position collecting module configured for collecting a current position information of a user; and wherein the determining unit is configured for determining an output direction for light from the backlight assembly based on the current position information of the user collected by the user position collecting module.

12. The display device according to claim 8, wherein the backlight assembly further comprises: a brightness enhancement film (BEF) located between the adjustable liquid crystal lens and the first polarizer.

13. The display device according to claim 8, wherein the liquid crystal in the adjustable liquid crystal lens is polymer network liquid crystal.

14. The display device according to claim 8, wherein the first polarizer is a reflective polarizer.

15. The display device according to claim 14, wherein the reflective polarizer is a dual brightness enhancement film (DBEF).

* * * * *